US007555711B2

(12) United States Patent
Chao et al.

(10) Patent No.: US 7,555,711 B2
(45) Date of Patent: Jun. 30, 2009

(54) GENERATING A TEXT LAYOUT BOUNDARY FROM A TEXT BLOCK IN AN ELECTRONIC DOCUMENT

(75) Inventors: Hui Chao, San Jose, CA (US); Xiaofan Lin, Sunnyvale, CA (US); Charles G. Nelson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 602 days.

(21) Appl. No.: 11/166,931

(22) Filed: Jun. 24, 2005

(65) Prior Publication Data

US 2006/0294460 A1 Dec. 28, 2006

(51) Int. Cl.
*G06F 17/00* (2006.01)
(52) U.S. Cl. .................. 715/246; 715/247; 715/243
(58) Field of Classification Search ................ 715/246, 715/247, 243, 244, 272; 382/224
See application file for complete search history.

(56) References Cited

U.S. PATENT DOCUMENTS

| 5,438,657 | A | 8/1995 | Nakatani |
| 5,459,827 | A | 10/1995 | Allouche et al. |
| 5,555,362 | A | 9/1996 | Yamashita et al. |
| 5,659,766 | A * | 8/1997 | Saund et al. ................ 704/9 |
| 5,784,487 | A | 7/1998 | Cooperman |
| 5,893,127 | A | 4/1999 | Tyan et al. |
| 5,987,171 | A | 11/1999 | Wang |
| 6,081,616 | A * | 6/2000 | Vaezi et al. ................ 382/171 |
| 6,665,840 | B1 * | 12/2003 | Wiley et al. ................ 715/234 |
| 6,868,524 | B1 * | 3/2005 | Fushiki et al. ............. 715/205 |
| 7,254,270 | B2 * | 8/2007 | Simske ...................... 382/224 |
| 2003/0229845 | A1 | 12/2003 | Salesin et al. |
| 2004/0019850 | A1 | 1/2004 | Purvis et al. |
| 2004/0019851 | A1 | 1/2004 | Purvis et al. |
| 2004/0194035 | A1 | 9/2004 | Chakraborty |
| 2004/0205472 | A1 | 10/2004 | Purvis |

OTHER PUBLICATIONS

Philip N. Smith et al., "Towards structured, block-based PDF," Electronic Publishing, vol. 8(2&3), 153-165 (Jun. & Sep. 1995).
George Nagy, "A prototype document image analysis system for technical journals," IEEE Computer 25, pp. 10-22, Jul. 1992.
William S. Lovegrove et al., "Document analysis of PDF files: methods, results and implications," Electronic Publishing, vol. 8(2&3), 207-220 (Jun. & Sep. 1995).
Hui Chao, "Background pattern recognition in multi-page PDF document," 3rd Int'l Workshop on Document Layout Interpretation and its Applications, DLIA2003 (2003).
Hui Chao, "PDF document layout study with page elements and bounding boxes," Int'l Workshop on Document Layout Interpretation and its Applications, DLIA2001 (2001).
Hui Chao et al., "Layout and Content Extraction for PDF Documents," DAS2004, Florence, Italy, 12 pages (Sep. 8-10, 2004).

* cited by examiner

*Primary Examiner*—Thu Huynh (57) ABSTRACT

Methods, systems and machine-readable instructions for processing an electronic document are described. In one aspect, logical blocks that were extracted from the electronic document, including a text block comprising text lines each encompassed by a respective bounding rectangle, are received. Edges of ones of the bounding rectangles are extended to at least one boundary without changing layout relationships among the logical blocks in the electronic document. A text layout boundary is generated from extended and unextended edges of the bounding rectangles. A description of the text layout boundary is stored in a machine-readable medium.

28 Claims, 10 Drawing Sheets

GENERATING A TEXT LAYOUT BOUNDARY FROM A TEXT BLOCK IN AN ELECTRONIC DOCUMENT

BACKGROUND

Electronic documents are created in many different ways. For example, desktop application programs, such as Microsoft Word, QuarkXPress, and Adobe InDesign, frequently are used to create electronic documents. These electronic documents contain various types of content arranged with a particular layout and style.

Oftentimes, it is desirable to preserve the graphic appearance of an electronic document. Image-based formats, such as TIFF, GIF, JPEG and the Portable Document Format (PDF), preserve the appearance of electronic documents. Electronic documents stored in such image-based formats, however, typically have large storage requirements. To reduce these storage requirements, many document analysis approaches have been developed for separating the structure of electronic documents that are stored in an image-based format from their contents. The structural information may be used to infer a semantic context that is associated with various contents in the electronic document or to convert the electronic documents into an editable file format.

Template-based electronic document formats describe a predefined layout arrangement of fields that are capable of accepting variable content. In some approaches, the size, shape and placement of the template fields are fixed. In another approach, an electronic document is represented as a template that contains predefined content areas whose positions and sizes may be varied within specified ranges. In particular, the content areas are defined by variables with respective value domains that define the size, position, and content of the content areas. A user specifies constraints that limit variable ranges and define relations between variables. A constraint solver generates a final document that satisfies all of the specified constraints.

None of the approaches described above, however, provides a way to automatically capture the graphic appearance of an electronic document in a way that is capable of accommodating variable content. With respect to textual content in particular, it is difficult to infer a graphic designer's intended layout from the actual position of the textual content, especially on unjustified sides of the text blocks and where text lines flow around neighboring logical blocks in the electronic document.

SUMMARY

In one aspect, the invention features a machine-implemented method of processing an electronic document. In accordance with this inventive method, logical blocks that were extracted from the electronic document, including a text block comprising text lines each encompassed by a respective bounding rectangle, are received. Edges of ones of the bounding rectangles are extended to at least one boundary without changing layout relationships among the logical blocks in the electronic document. A text layout boundary is generated from extended and unextended edges of the bounding rectangles. A description of the text layout boundary is stored in a machine-readable medium.

The invention also features a system and machine-readable instructions for implementing the electronic document processing method described above.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The embodiments that are described in detail below provide ways of automatically capturing and expressing the graphic appearance of an electronic document that allow the graphic appearance to be preserved in derivative documents that contain different contents. In one aspect, these embodiments automatically infer a text layout boundary from the actual position of the textual content in an electronic document. The text layout boundary corresponds to an intended template area for textual content, including on unjustified sides of the text blocks and where text lines flow around neighboring logical blocks in the electronic document. In this way, these embodiments enable the look and feel of an electronic document, including in textual regions, to be preserved in derivative electronic documents that have different contents. In variable data printing applications, for example, these embodiments may be used to create personalized direct mail pieces that contain unique information that is customized for each recipient while maintaining the same look and feel across all of the mail pieces.

I. GENERAL FRAMEWORK

Figure 1:
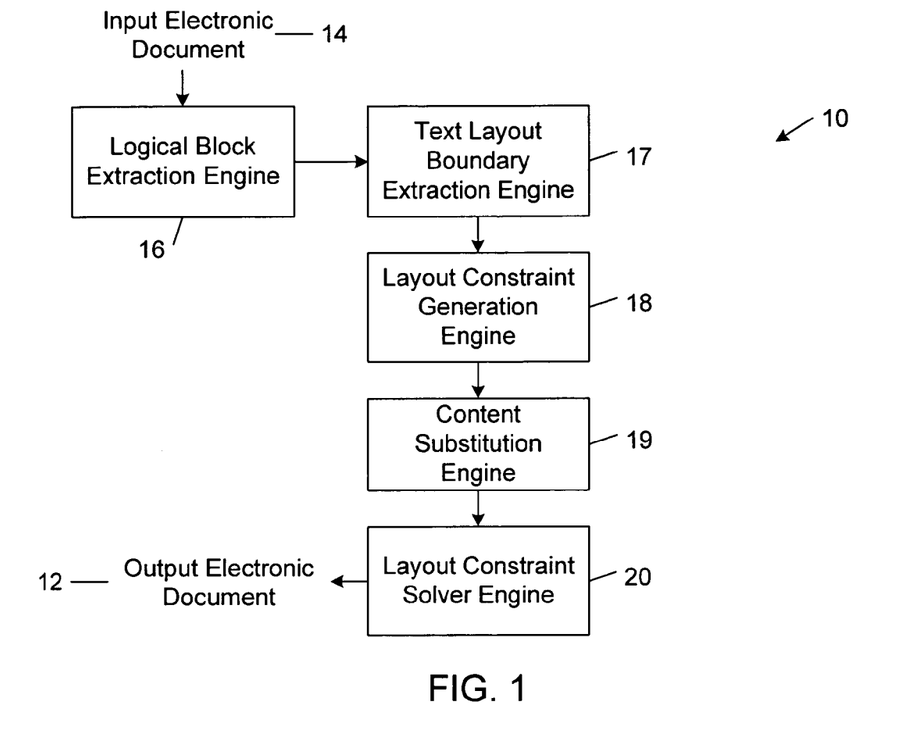
FIG. 1 is a block diagram of an embodiment of a system for processing an electronic document.

FIG. 1 shows an embodiment of an electronic document processing system 10 for generating an output electronic document (FIG. 1, output 12) having substantially the same look and feel as an input electronic document (FIG. 1, input 14) but containing different content.

In general, the input electronic document (FIG. 1, input 14) and the output electronic document (FIG. 1, output 12) may be any type of electronic document, including an editable markup document (e.g., an Adobe FrameMaker document, a rich text format document, or a Microsoft Word document), a formatted markup document (e.g., an Adobe PDF document or an Adobe PostScript document), and a rendered image document (e.g., a bit map image document). Each of the input electronic document (FIG. 1, input 14) and the output electronic document (FIG. 1, output 12) may contain one or more pages of content. In the illustrated embodiment, the electronic document processing system 10 processes the input electronic document (FIG. 1, input 14) on a page-by-page basis; although in some implementations, the electronic document processing system 10 may process a page of input electronic document (FIG. 1, input 14) based on information obtained from an analysis of one or more other pages of the input electronic document (FIG. 1, input 14).

The electronic document processing system 10 includes a logical block extraction engine 16, a text layout boundary extraction engine 17, a layout constraint generation engine 18, a content substitution engine 19, and a layout constraint solver engine 20. These engines 16-20 may be implemented in any computing or processing environment, including in digital electronic circuitry or in computer hardware, firmware, or software. In some embodiments, the logical block extraction engine 16, the text layout boundary extraction engine 17, the layout constraint generation engine 18, the content substitution engine 19, and the layout constraint solver engine 20 are implemented by one or more respective software modules that are executed on a computer. The layout constraint solver 20 may be implemented by any one of a wide variety of different constraint solving systems. In the illustrated embodiments, the layout constraint solver 20 is implemented by a simplex-based linear solver system.

Computer process instructions for implementing the engines 16-20 and the data generated by the engines 16-20 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

Figure 2:
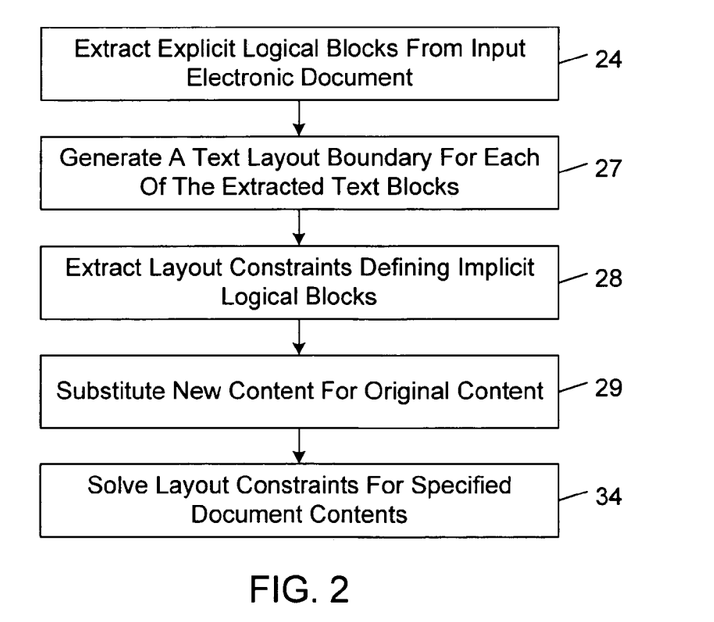
FIG. 2 is a flow diagram of an embodiment of a method of processing an electronic document.
Figure 3:
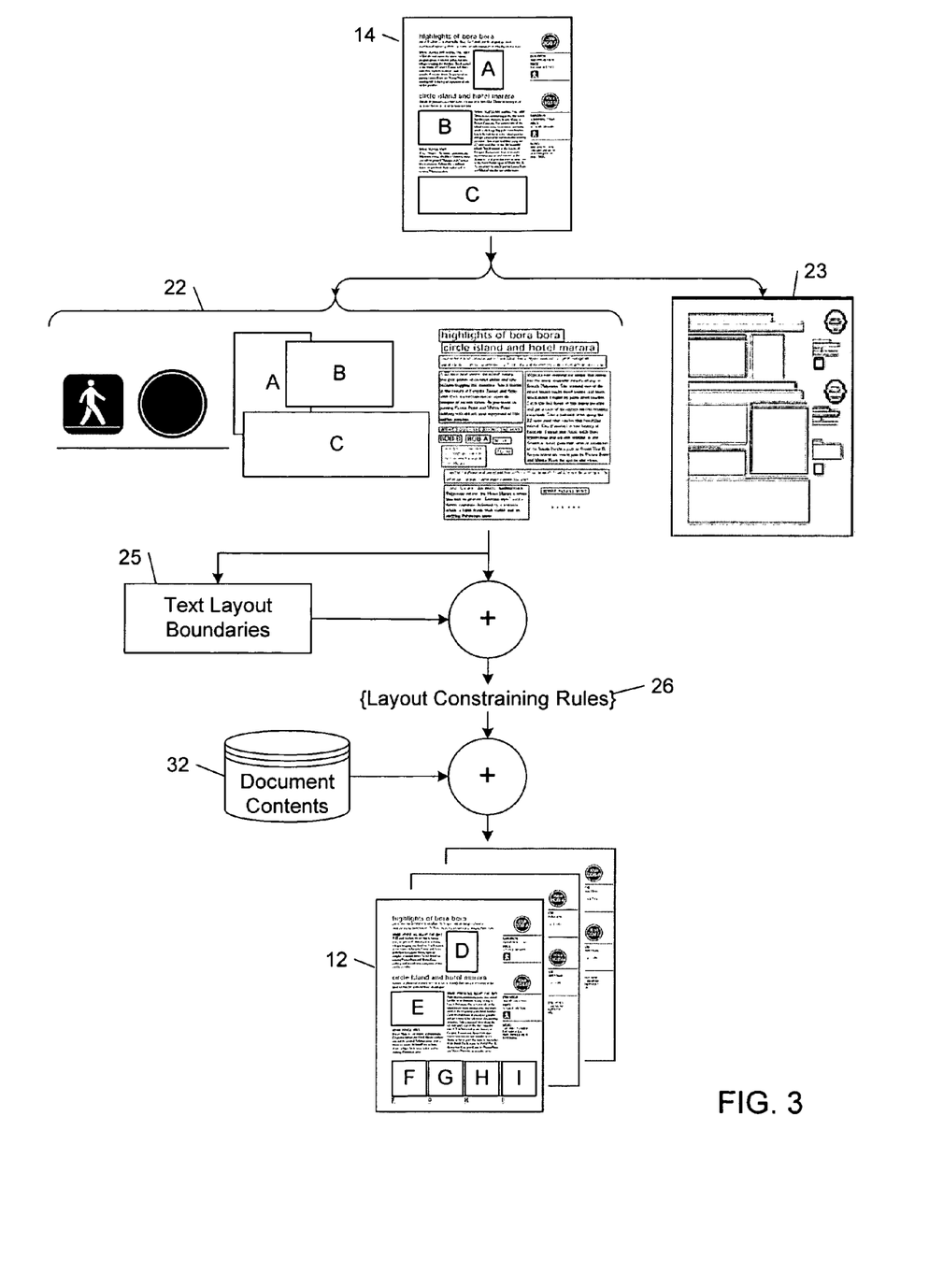
FIG. 3 is a diagrammatic view of data flow in the electronic document processing method of FIG. 2.

Referring to FIGS. 2 and 3, in one embodiment, the electronic document processing system 10 (FIG. 1) generates the output electronic document (FIG. 1, output 12) based on an analysis of the input electronic document (FIG. 1, input 14) and on specified document content, as follows.

The logical block extraction engine 16 extracts explicit logical blocks 22 and their layout 23 from the input electronic document (FIG. 1, input 14; FIG. 2, step 24). In this process, the logical block extraction engine 16 identifies different explicit logical blocks in the input electronic document (FIG. 1, input 14). As used herein, the term "logical block" refers to a region of content in the electronic document that is determined to have a homogenous content style and a homogenous semantic context (e.g., document title, header, and paragraph for logical blocks containing textual content). The word "explicit" refers to the fact that the logical blocks in the input electronic document (FIG. 1, input 14) are fully determined in terms of layout, style, and content. In particular, the input electronic document (FIG. 1, input 14) contains homogeneous regions having respective contents (e.g., text, images, such as images A, B, and C, or vector graphics) that are arranged with a particular layout and presented with a particular style. The logical block extraction engine 16 identifies these homogeneous regions as explicit logical blocks, separates the layout of the explicit logical blocks from their contents, and extracts the layout style of the identified logical blocks.

In addition to identifying textual logical blocks (or text blocks) corresponding to homogeneous regions of textual content, the logical block extraction engine 16 (FIG. 1) also determines a respective bounding rectangle for each of the text lines in the text blocks. The "bounding rectangle" (also referred to as a bounding box) of a text line refers to the smallest rectangle with vertical and horizontal sides that encompasses the text line.

After the explicit logical blocks 22 and their layout 23 have been extracted from the input electronic document (FIG. 1, input 14; FIG. 2, step 24), the text layout boundary extraction engine 17 (FIG. 1) generates a respective text layout boundary 25 (FIG. 3) for each of the text blocks that are extracted from the input electronic document (FIG. 1, input 14) by the logical block extraction engine 16 (FIG. 2, step 27). In this process, the text layout boundary extraction engine 17 analyzes the actual positions of the textual content in the text blocks and the layout relationships between the text blocks and adjacent ones of the other explicit logical blocks in the input electronic document (FIG. 1, input 14). As used herein, the term "layout relationship" refers to the relative positions of logical blocks in an electronic document, including overlapping and non-overlapping relationships, and the relative layering order of the logical blocks.

As explained in detail below, the text layout boundary extraction engine 17 (FIG. 1) infers a text layout boundary 25 (FIG. 3) with respect to which the constituent text lines of a text block apparently are wrapped to form corresponding terminal edges of the bounding rectangles of the text lines. The text layout boundary 25 preserves the layout relationships among the explicit logical blocks in the input electronic document (FIG. 1, input 14). In this process, the text layout boundary extraction engine 17 may differentiate between natural text line breaks and intended text wrapping to a shape (e.g., the bounding polygon of an adjacent logical block). The resulting text layout boundary 25 may be used as a template area that is accommodative of variable textual content while maintaining substantially the same look and feel as the corresponding text blocks in the input electronic document (FIG. 1, input 14).

After the respective text layout boundaries 25 (FIG. 3) have been extracted (FIG. 2, step 27), the layout constraint generation engine 18 (FIG. 1) generates rules 26 (FIG. 3) that define implicit logical blocks (FIG. 2, step 28). Each of the implicit logical blocks corresponds to a respective one of the explicit logical blocks and can accommodate variable content having the content style assigned to the corresponding explicit logical block. The word "implicit" refers to the fact that the layout constraining rules 26 merely define some of the attributes of potential logical blocks; they do not assign contents nor final position coordinates to the logical blocks and therefore do not fully determine the logical blocks.

The content substitution engine 19 (FIG. 1) then substitutes new content for the original content (FIG. 2, step 29). In this process, the content substitution engine 19 assigns a specified set of document contents 32 (FIG. 3) to the implicit logical blocks.

After the layout constraining rules 26 have been generated (FIG. 2, step 28) and the new content has been substituted for the original content (FIG. 2, step 29), the layout constraint solver engine 20 (FIG. 1) generates the output electronic document (FIG. 1, output 12) by solving the layout constraints for the specified set of document contents 32 that are assigned to the implicit logical blocks by the content substitution engine 19 (FIG. 2, step 34). As shown in FIG. 3, multiple customized output electronic documents may be generated based on the layout constraining rules 26 simply by changing the document contents assigned to the implicit logical blocks.

II. EXTRACTING EXPLICIT LOGICAL BLOCKS

In general, the logical block extraction engine 16 (FIG. 1) may extract explicit logical blocks from the input electronic document (FIG. 1, input 14) by executing any type of logical block extraction process that segments an electronic document into logical components, separates the layout of the explicit logical blocks from their contents, and extracts a layout style of the identified logical blocks.

Figure 4:
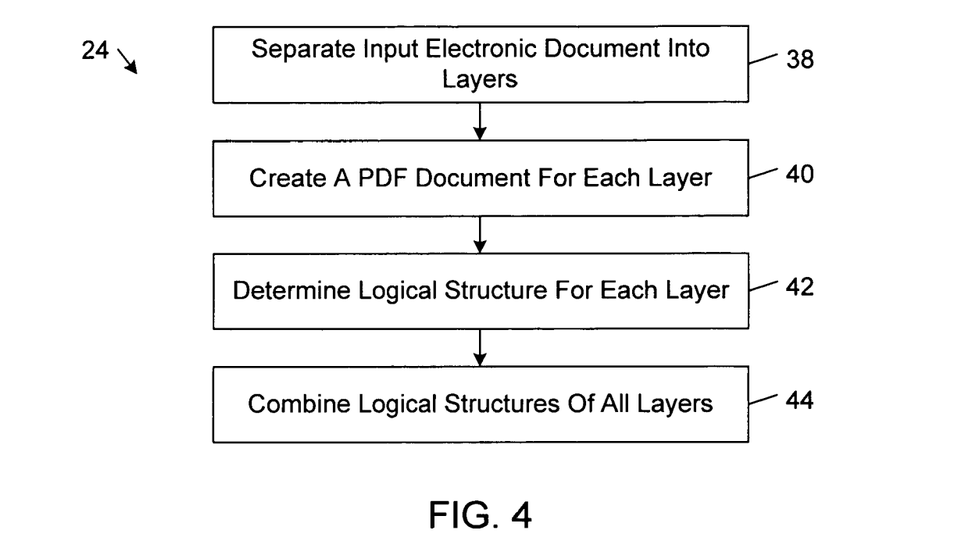
FIG. 4 is a flow diagram of an embodiment of a method of extracting explicit logical blocks from an input electronic document.
Figure 5:
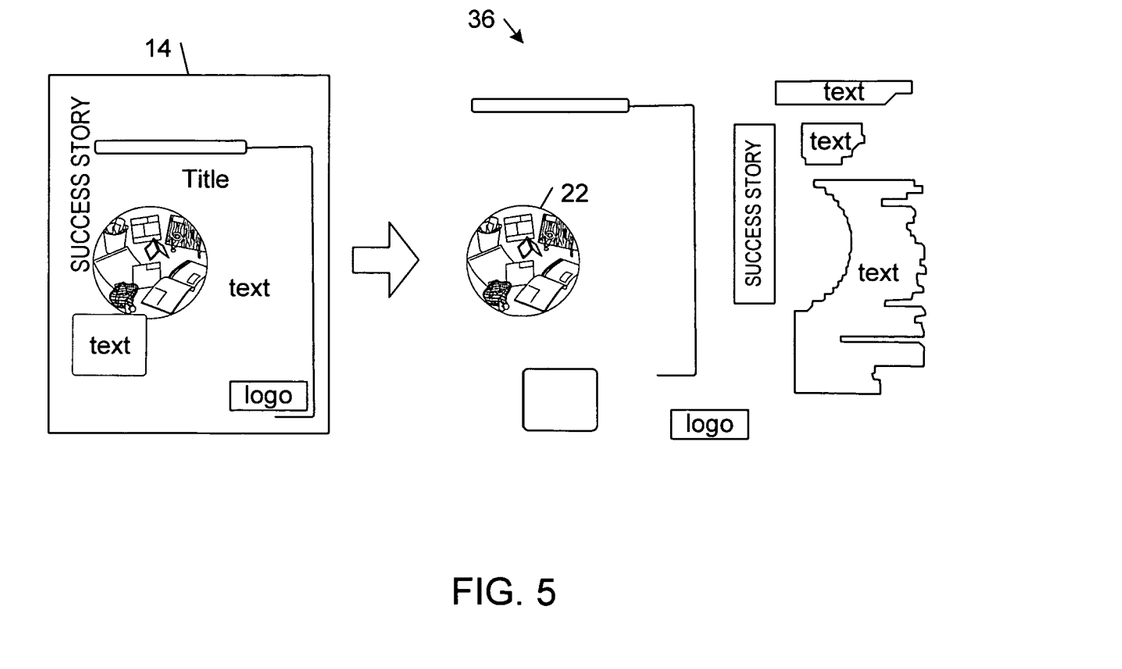
FIG. 5 is a diagrammatic view of an exemplary electronic document and a set of explicit logical blocks extracted from the electronic document in accordance with the method of FIG. 4.

Referring to FIGS. 4 and 5, in one exemplary implementation, the logical block extraction engine 16 (FIG. 1) extracts explicit logical blocks (FIG. 2, step 24) from an input electronic document (FIG. 1, input 14), as follows. In this implementation, the input electronic document (FIG. 1, input 14) is encoded in the PDF file format, which includes tags for text objects, image objects, and path objects (i.e., vector graphic objects).

In accordance with this implementation, the logical block extraction engine 16 separates the input electronic document (FIG. 1, input 14) into layers 36 (FIG. 5) based on content type (FIG. 4, step 38). The layers may include a text layer, an image layer, and a vector graphics layer. A separate PDF document is created for each of the layers (FIG. 4, step 40).

A logical structure is determined for each of the layers (FIG. 4, step 42). The logical structure describes the content, layout structure, and layout style of the explicit logical blocks in a given layer. The layout style of a logical block is described by a style attribute vector, which includes an indication of the content type (e.g., text, image, or vector graphic) and a set of style attributes. In one implementation, the style attributes describe: font size, font family, color, orientation, bounding box coordinates, and outline polygon coordinates for textual content; the aspect ratio, the shape, the bounding box coordinates, and outline polygon coordinates for image content; and bounding box coordinates and outline polygon coordinates for vector graphic content. The "outline polygon" of a logical block corresponds to a polygon that encompasses and traces the outline of the content of the logical block. The "bounding box" of a logical block refers to the smallest rectangle with vertical and horizontal sides that encompasses the outline polygon of the logical block.

The logical structures of each of the layers are combined to determine the logical structures of all of the layers 36 of the input electronic document (FIG. 1, input 14; FIG. 4, step 44). In this process, the logical block extraction engine 16, determines the relative positions (page coordinates) of the explicit logical blocks of the explicit logical blocks and associates with each logical block a layer index, which determines the order in which the logical blocks are laid down on the pages of the input electronic document (FIG. 1, input 14). The information (e.g., logical block content, layout, style, relative positions, and layering order) that is extracted from the input electronic document (FIG. 1, input 14) may be described in XML (eXtensible Markup Language) or other format, and stored in a machine-readable medium.

Additional details regarding the explicit logical block extraction method of FIG. 4 may be obtained from U.S. patent application Ser. No. 10/787,971, which was filed Feb. 27, 2004, by Hui Chao et al. and is entitled "Method for Determining Logical Components of a Document," and is incorporated herein by reference.

III. INFERRING A TEXT LAYOUT BOUNDARY FROM A TEXT BLOCK IN AN ELECTRONIC DOCUMENT

A. Overview

The embodiments that are described in section III automatically infer from the actual position of the textual content in an electronic document a text layout boundary that corresponds to an intended template area for textual content, including unjustified sides of the text blocks and where text lines flow around neighboring logical blocks in the electronic document. In this way, these embodiments enable the look and feel of the textual regions of an electronic document to be preserved in derivative electronic documents that have different contents.

Figure 6:
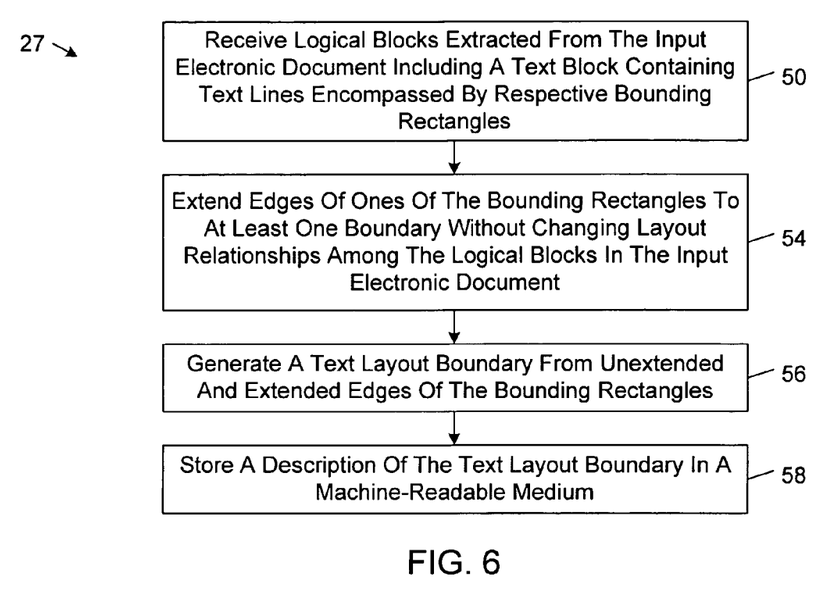
FIG. 6 is a flow diagram of an embodiment of a method of processing an electronic document.

FIG. 6 shows a flow diagram of an embodiment of a method by which the text layout boundary extraction engine 17 (FIG. 1) generates a respective text layout boundary 25 for each of the text blocks that are extracted from the input electronic document (FIG. 1, input 14) by the logical block extraction engine 16 (FIG. 1; FIG. 2, step 27).

The text layout boundary extraction engine 17 (FIG. 1) receives the logical blocks 22 and the layout 23 that the logical block extraction engine 16 extracted from the input electronic document (FIG. 1, input 14; FIG. 6, step 50). FIG.

Figure 7:
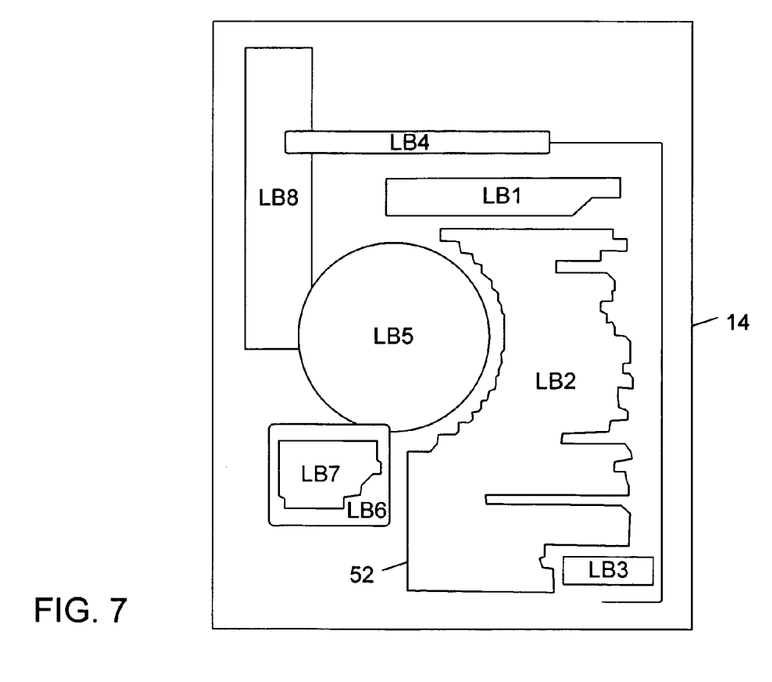
FIG. 7 shows layout relationships among explicit logical blocks extracted from an exemplary electronic document.

7 shows an exemplary set of logical blocks (LB1 through LB8) that were extracted from an exemplary implementation of the input electronic document (FIG. 1, input 14). Among the logical blocks that are received by the text layout boundary extraction engine 17 is a text block 52 (LB2) that contains parallel text lines that are encompassed by respective bounding rectangles.

The text layout boundary extraction engine 17 (FIG. 1) extends edges of ones of the bounding rectangles to at least one boundary without changing layout relationships among the logical blocks in the input electronic document (FIG. 1, input 14; FIG. 6, step 54). The extended edges typically approximate at least a portion of a boundary of a template area that was used at least implicitly by a graphical designer to constrain the placement of the textual content of the text block in the input electronic document (FIG. 1, input 14). As a result, these extended edges typically preserve the same look and feel as the corresponding edges of the original text block while accommodating variable content. In the process of extending the bounding rectangle edges, the text layout boundary extraction engine 17 may differentiate between natural text line breaks and intended text wrapping to a shape (e.g., the bounding polygon of an adjacent logical block). The resulting text layout boundary 25 preserves the layout relationships between the text block and the other explicit logical blocks that were extracted from the input electronic document (FIG. 1, input 14).

Figure 8:
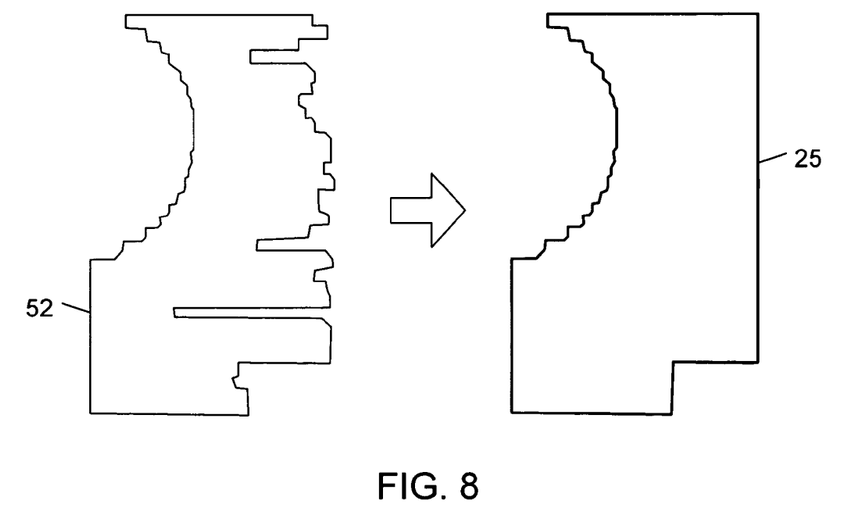
FIG. 8 shows an outline of the bounding rectangles of text lines in a text block and a text layout boundary derived from the bounding rectangles of the text block.

The text layout boundary extraction engine 17 (FIG. 1) generates a text layout boundary 25 from extended and unextended edges of the bounding rectangles of the text lines in the text block (FIG. 6, step 56). In this process, the text layout boundary extraction engine 17 connects the edges of adjacent bounding rectangles at the periphery of the text block to form the text layout boundary 25. FIG. 8 shows an exemplary text layout boundary 25 that is derived from the bounding rectangles of the text block 52.

Frequently, textual content is unjustified on at least one side of a text block. The bounding rectangle outline that is formed by connecting the terminal edges of the bounding rectangles on the unjustified side of the text block tends to be irregularly shaped as a result of natural line breaks between adjacent text lines. For example, as shown in FIG. 8, the right side of the text block 52 is unjustified and, consequently, the boundary formed by connecting the terminal edges of the bounding rectangles on the right side of the text block 52 is quite irregular. Such an irregular boundary typically does not accommodate new textual content in a way that preserves the intended graphical appearance of the logical block because the new textual content typically has different natural line breaks than the original textual content. On the other hand, the text layout boundary 25, which includes a more uniform boundary on the unjustified side of the text block, tends to better correspond to the intended graphical boundaries between the text block and neighboring ones of the logical blocks in the input electronic document (FIG. 1, input 14). In addition, the text layout boundary 25 can better accommodate the different natural line breaks that are likely to occur with different textual content because of the additional space available for receiving the variable textual content.

The text layout boundary extraction engine 17 (FIG. 1) stores a description of the text layout boundary 25 in a machine-readable medium (FIG. 6, step 58). In some embodiments, the description of the text layout boundary 25 is in an XML (eXtensible Markup Language) format. Storage devices suitable for tangibly embodying the description of the text layout boundary 25 include all forms of non-volatile memory, including, for example, semiconductor memory devices, such as EPROM, EEPROM, and flash memory devices, magnetic disks such as internal hard disks and removable disks, magneto-optical disks, and CD-ROM.

B. Extending the Edges of Bounding Rectangles

In the methods described in this section, the text layout boundary extraction engine 17 (FIG. 1) identifies and processes the edges of the bounding rectangles on unjustified sides of the text block. The text layout boundary extraction engine 17 processes one of the identified unjustified sides of the text block at a time. In some implementations, the text layout boundary extraction engine 17 determines that the text block is: left-aligned, if the left edges of the constituent text lines are aligned to a straight line; right-aligned, if the right edges of the constituent text lines are aligned to a straight line; and center-aligned, if the center horizontal coordinate of each the constituent text lines is the same. If the text block is left-aligned, the text layout boundary extraction engine 17 processes the bounding rectangle edges on the unjustified right side of the text block. If the text block is right-aligned, the text layout boundary extraction engine 17 processes the bounding rectangle edges on the unjustified left side of the text block. If the text block is center-aligned, the text layout boundary extraction engine 17 processes the bounding rectangle edges on the unjustified left and right sides of the text block. The text layout boundary extraction engine 17 does not extend the edges of bounding rectangles of text lines in text blocks that are full-justified. Instead, the text layout boundary extraction engine 17 skips to the text layout boundary generation process of block 56 in the method of FIG. 6.

Although the following methods are described in the context of horizontally-aligned textual content, these embodiments readily may be applied to vertically oriented textual content in an analogous way (e.g., by processing the top and bottom edges of vertically-aligned text lines in the way that the left and right edges of the horizontally-aligned text are respectively processed below).

Figure 9:
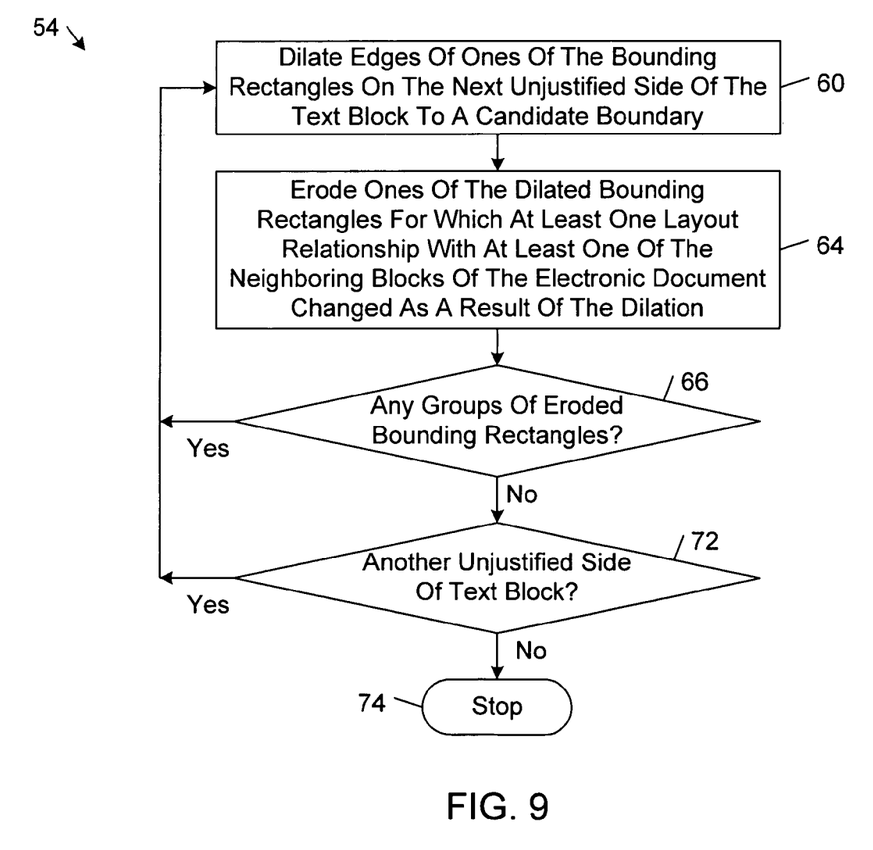
FIG. 9 is a flow diagram of an implementation of the method of FIG. 6.

FIG. 9 shows an embodiment of a method by which the text layout boundary extraction engine 17 extends the edges of ones of the bounding rectangles to at least one boundary (FIG. 6, step 54).

Figure 10A:
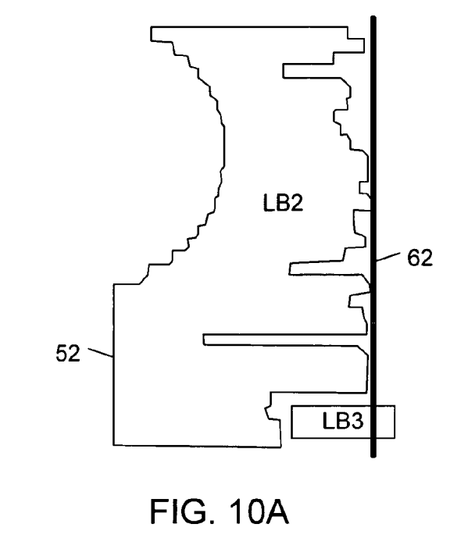
FIGS. 10A-10D show boundaries identified in accordance with the method of FIG. 9 for an unjustified side of an exemplary text block.

In accordance with the method of FIG. 9, the text layout boundary extraction engine 17 (FIG. 1) dilates edges of ones of the bounding rectangles on the next unjustified side of the text block to a candidate boundary (FIG. 9, step 60). With respect to the exemplary text block 52 that is shown in FIG. 10A, the text layout boundary extraction engine 17 generates a candidate boundary 62 that is aligned with a maximal edge of the text block 52 on its unjustified right side. The candidate boundary 62 extends along the entire length of the unjustified right side of the text block 52.

Figure 10B:
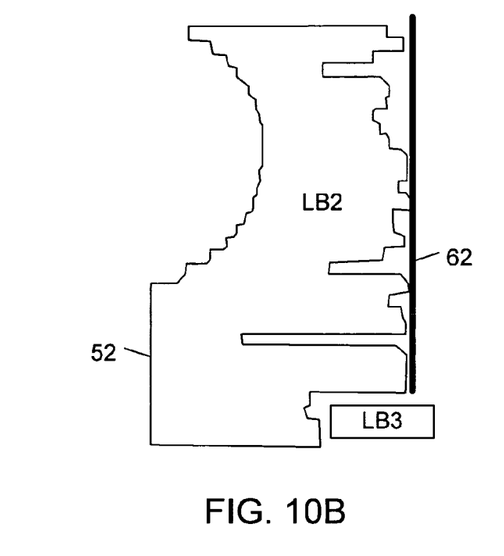

After the dilation process (FIG. 9, step 60), the text layout boundary extraction engine 17 (FIG. 1) erodes ones of the dilated bounding rectangles for which at least one layout relationship with at least one of the neighboring blocks of the input electronic document (FIG. 1, input 14) changed as a result of being dilated (FIG. 9, step 64). In the example shown in FIG. 10A, the text lines at the bottom of the text block 52 wrap around the adjacent logical block LB3. If the bounding rectangles of these text lines were extended to the candidate boundary 62, their layout relationships with the logical block LB3 would change because they would overlap the logical block LB3. Therefore, in accordance with the process of block 64, the text layout boundary extraction engine 17 erodes the edges of these bounding rectangles back to their original positions, as signified in FIG. 10B by the removal of the candidate boundary 62 in locations adjacent the eroded bounding rectangles.

Figure 10C:
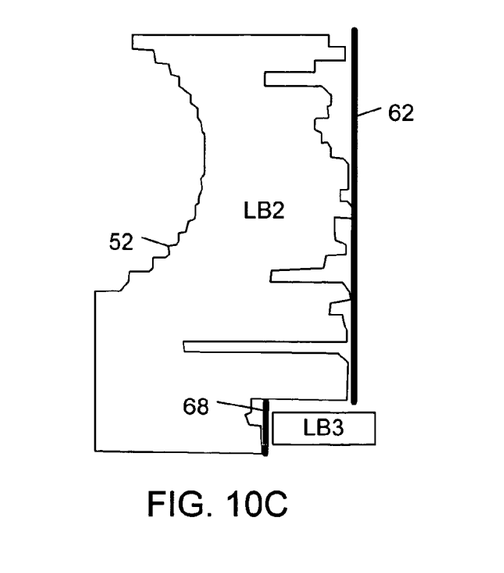

The dilating and eroding processes (FIG. 9, steps 60, 64) are repeated for any groups of bounding rectangles that were eroded in the process of block 64 (FIG. 9, step 66). In this process, the text layout boundary extraction engine 17 (FIG. 1) determines a respective candidate boundary for each of the groups of eroded bounding rectangles. With respect to the example shown in FIG. 10C, the text layout boundary extraction engine 17 generates a second candidate boundary 68 for the group of eroded boundary rectangles that wrap around the logical block LB3 at the bottom of the text block 52. The text layout boundary extraction engine 17 then determines whether the bounding rectangles in the eroded group are extendable to the second candidate boundary 68 in accordance with the process described above.

Figure 10D:
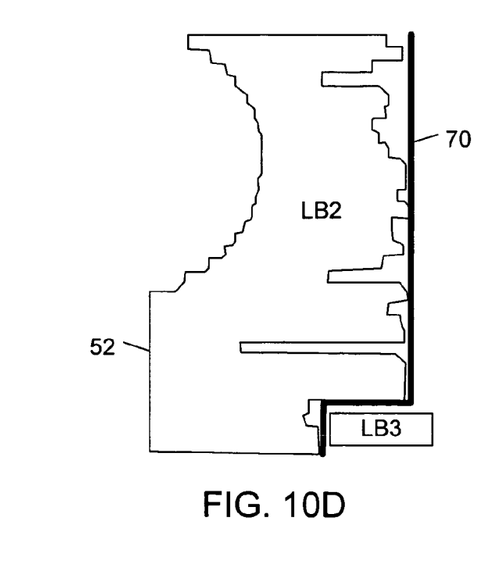

After all of the groups of eroded bounding rectangles have been processed (FIG. 9, step 66), the peripheral edges of the bounding rectangles on the current unjustified side of the text block form a candidate boundary 70 for one side of the text layout block, as shown in FIG. 10D.

The text layout boundary extraction engine 17 (FIG. 1) repeats the above-described process (FIG. 9, steps 60, 64, 66) for the next one of the identified unjustified sides of the text block (FIG. 9, step 72). If there are no other unjustified sides of the text blocks to process (FIG. 9, step 72), the process stops (FIG. 9, step 74).

Figure 11:
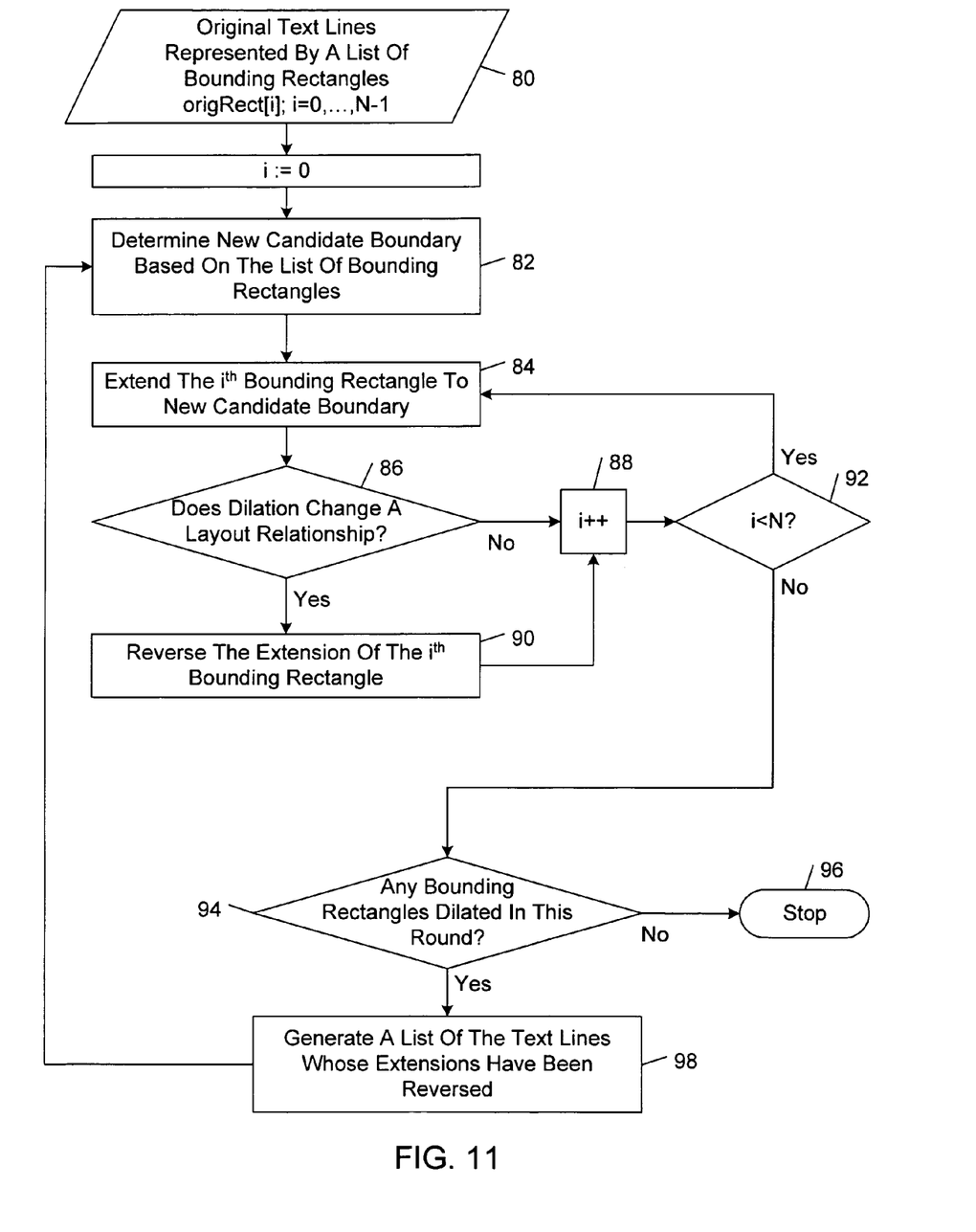
FIG. 11 is a flow diagram of an implementation of a method of dilating and eroding the bounding rectangles of text lines in a text block.

FIG. 11 shows an implementation of the method of FIG. 9. In this implementation, the original N text lines of a text block are represented by a list 80 of N bounding rectangles, which are denoted origRect[i], where $i=0, \ldots, N-1$.

In this implementation, the text layout boundary extraction engine 17 (FIG. 1) determines a new candidate boundary based on the list of bounding rectangles (FIG. 11, step 82). In this regard, the text layout boundary extraction engine 17 determines a maximal one of the edges of the bounding rectangles on the unjustified side of the text block. If the pixels of the input electronic document (FIG. 1, input 14) are referenced with respect to a coordinate system with an origin that is located at the lower left corner of the input electronic document (FIG. 1, input 14), the maximal boundary edge corresponds either to the edge that is aligned with the maximal horizontal coordinate for left-aligned text or to the edge that is aligned with the minimal horizontal coordinate for right-aligned text. The horizontal coordinates of the maximal boundary edges for right and left dilations (i.e., rightRef[j] and leftRef[j], where j is an index identifying the different candidate boundaries) may be determined as follows:

$$\text{right}Ref[j]=\max(\text{orig}Rect[i].\text{right}) \quad (1)$$

$$\text{left}Ref[j]=\min(\text{orig}Rect[i].\text{left}) \quad (2)$$

The maximum and minimum are taken as i varies from 0 to $N-1$, where i is an index identifying the text lines that have not been dilated or reversed to their original bounding rectangles. The text layout boundary extraction engine 17 then extends the $i^{th}$ bounding rectangle to the new candidate boundary (FIG. 11, step 84). That is, the text layout boundary extraction engine 17 extends the right side of the bounding rectangle to rightRef[j] for right-side dilations and extends the left side of the boundary rectangle to leftRef[j] for left-side dilations. That is:

$$\text{Rect1}[i].\text{right}=\text{right}Ref[j] \quad (3)$$

$$\text{Rect1}[i].\text{Left}=\text{left}Ref[j] \quad (4)$$

where Rect1[i] represents the current bounding rectangle for the $i^{th}$ text line.

If the extension of the $i^{th}$ bounding rectangle does not change a layout relationship with any adjacent logical blocks (FIG. 11, step 86), the index i is incremented. If the extension of the $i^{th}$ bounding rectangle does change a layout relationship with any adjacent logical blocks (FIG. 11, step 86), the text layout boundary extraction engine 17 reverses the extension of the $i^{th}$ bounding rectangle (FIG. 11, step 90) before the index i is incremented (FIG. 11, step 88). In this process, the text layout boundary extraction engine 17 reverses the extension of the $i^{th}$ bounding rectangle to its original position. That is:

$$\text{Rect1}[i]=\text{orig}Rect[i] \quad (5)$$

If there are remaining bounding rectangles to process (i.e., $i<N$; FIG. 11, step 92), the dilation and erosion processes (FIG. 11, steps 84, 96, 90) are repeated. Otherwise, the text layout boundary extraction engine 17 determines whether any bounding rectangles were dilated in this round of processing (FIG. 11, step 94). If none of the bounding rectangles were dilated in this round (FIG. 11, step 94), the process terminates (FIG. 11, step 96). Otherwise, the text layout boundary extraction engine 17 generates a list of the text lines whose extensions have been reversed (FIG. 11, step 98) and repeats the above-described process.

Figure 12A:
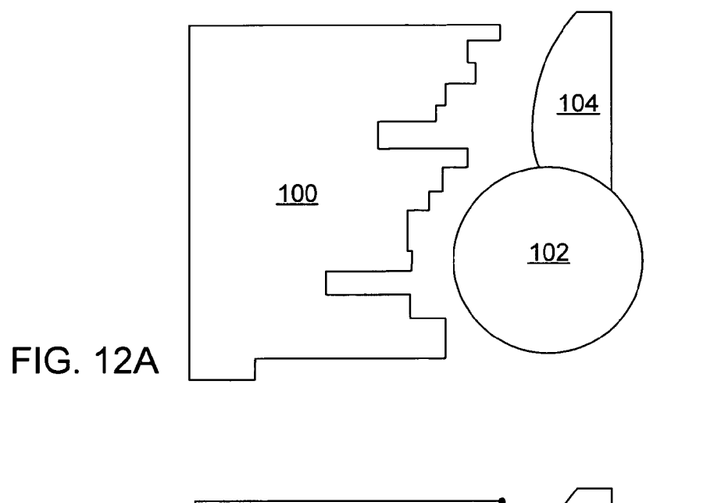
FIG. 12A shows an exemplary group of logical blocks, including a text block, that were extracted from an electronic document.
Figure 12B:
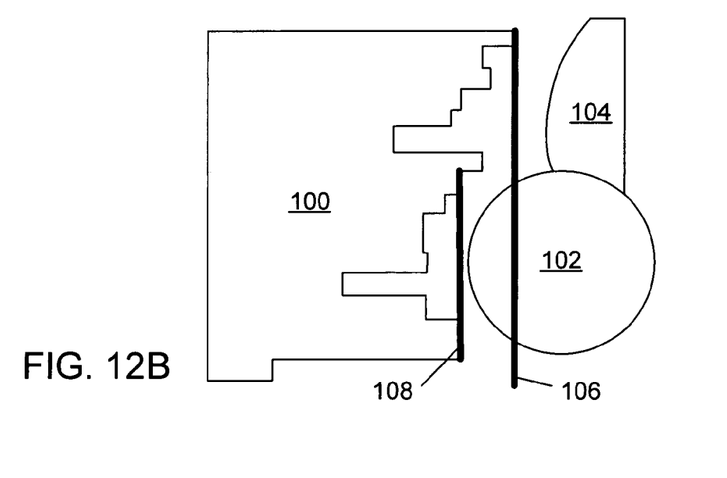
FIG. 12B shows two identified boundaries to which respective groups of the bounding rectangles of the text lines in the text block shown in FIG. 12A are extendable without changing layout relationships among the logical blocks in the electronic document.
Figure 12C:
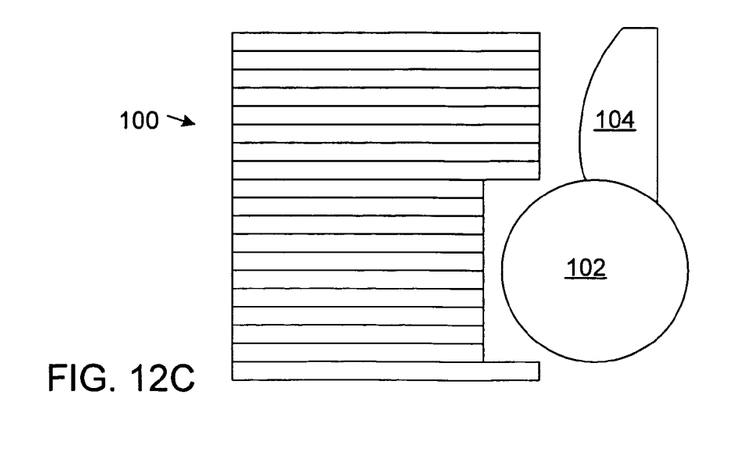
FIG. 12C shows the logical blocks of FIG. 12B after the bounding rectangles of the text block have been extended to respective ones of the identified boundaries.

FIGS. 12A-12C show a layout of a text block 100 and two adjacent logical blocks 102, 104 during execution of the process of FIG. 11. In particular, FIG. 12A shows the outline of the text block 100 that is formed by connecting the edges of the bounding rectangles at the periphery of the text block 100 and the bounding shapes of adjacent logical blocks 102, 104. FIG. 12B shows the first and second candidate boundaries 106, 108 (i.e., rightRef[0] and rightRef[1]) that are generated by the text layout boundary extraction engine 17 during execution of the dilation process of block 84 in the method of FIG. 11. FIG. 12C shows the constituent bounding rectangles of the text block after they have undergone the dilation and erosion processes of block 84 and 90 in the method of FIG. 11.

In some embodiments, the text layout boundary extraction engine 17 (FIG. 1) refines the dilation processes described above by extending the bounding rectangles of the constituent text lines based on an analysis of the text content of the text lines. In this process, the text layout boundary extraction engine 17 attempts to distinguish natural text line breaks from intended text wrapping to a shape other than the candidate boundaries. In these implementations, the text layout boundary extraction engine 17 determines whether a bounding box of a current text line is extendable to a candidate boundary by comparing the distance between the terminal edge of the bounding rectangle and the candidate boundary to the length of the first word in the subsequent text line. If the distance is less than the length of the first word in the subsequent text line, the text layout boundary extraction engine 17 extends the bounding rectangle of the current text line to the candidate boundary; otherwise, the bounding rectangle of the current text line is not extended. The text layout boundary extraction engine 17 also may determine whether the bounding rectangles are extendable based on syntactical elements of the corresponding text lines. For example, if the terminal character of the current text line is a period, the text layout boundary extraction engine 17 may extend the corresponding bounding rectangle to the candidate boundary.

C. Processing Bounding Rectangle Edges to Better Approximate Text Wrapping Around Adjacent Logical Blocks FIG. 13 shows an embodiment of a method by which the text layout boundary extraction engine 17 (FIG. 1) processes the bounding rectangle edges to better approximate text wrapping around logical blocks adjacent to the text block.

Figure 13:
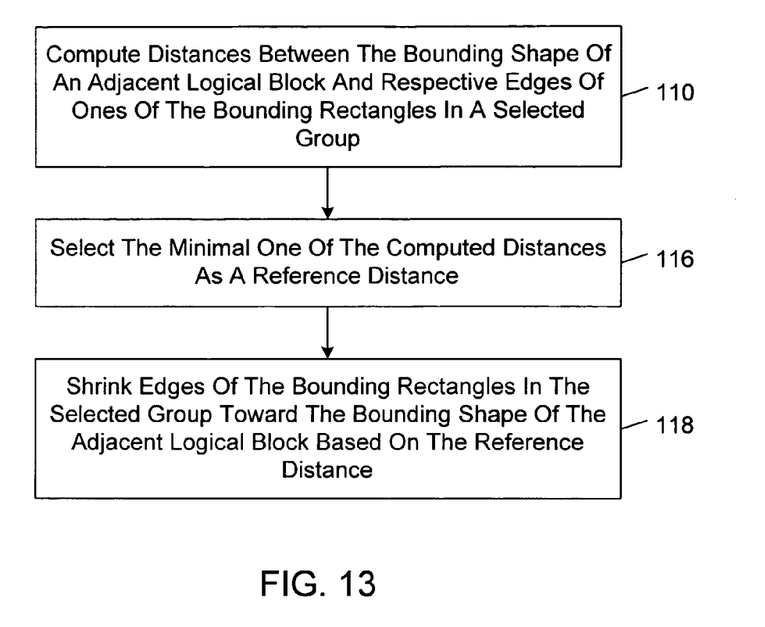
FIG. 13 is a flow diagram of an embodiment of a method of processing edges of bounding rectangles to better approximate an intended text wrapping around adjacent logical blocks.

In accordance with this embodiment, the text layout boundary extraction engine 17 computes distances between the bounding shape of an adjacent logical block and respective edges of ones of the bounding rectangles in a selected group (FIG. 13, step 110). In some implementations, distances are computed only for the least-modified ones of the bounding rectangles. For example, in these implementations, the group of bounding rectangles for which distances are computed may correspond to the bounding rectangles that were eroded to their original bounding rectangles in the embodiments described above in section III.B. In other implementations, distances are computed for all the original bounding rectangles origRect[i]. The distances are computed from the edges of the bounding rectangles in the selected group to the closest bounding shape of the neighboring logical blocks.

The distance measure that is computed by the text layout boundary extraction engine 17 corresponds to the shortest distance between a point P(x, y) on the edge of a boundary rectangle to the points on the bounding shape of the nearest logical block. In some instances the bounding shape may be represented by a Bezier curve R(t):

$$R(t)=(1-t)^3 P_0(x,y)+3t(1-t)^2 P_1(x,y)+3t^2(1-t)P_2(x,y)+t^3 P_3(x,y) \quad (6)$$

where t ranges from 0 to 1 (inclusive). In these instances, the point Pr(x, y, t) on the Bezier curve can be expressed as:

$$Pr(x,y,t)=(1-t)^3 P_0(x,y)+3t(1-t)^2 P_1(x,y)+3t^2(1-t)P_2(x,y)+t^3 P_3(x,y) \quad (7)$$

Figure 14A:
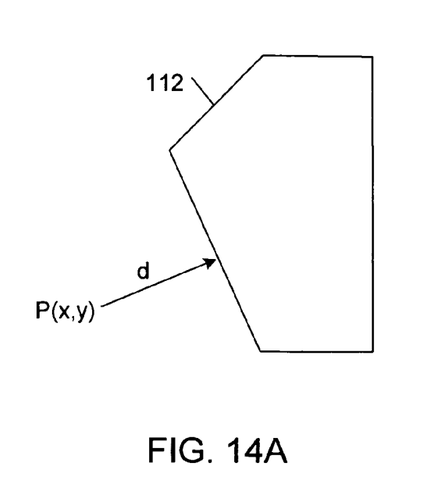
FIG. 14A shows a distance between a point and a polygon that corresponds to the length of a line from the point to a point between two vertices of the polygon.
Figure 14B:
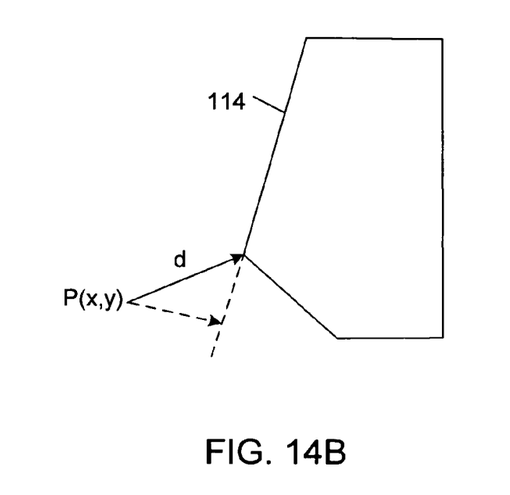
FIG. 14B shows a distance between a point and a polygon that corresponds to the length of a line from the point to a vertex of the polygon.

In this case, the distance (Dis) between P(x, y) to the Curve R(t) is given by:

$$Dis=\min(|P(x,y)-Pr(x,y,t)|) \quad (8)$$

where $0 \leq t \leq 1$. In other instances, the bounding shape of the nearest logical block is represented by a bounding polygon, such as the bounding polygons 112, 114 that are shown in FIGS. 14A and 14B. The distance between a point P(x, y) to a polygon is the shortest distance between the point P(x, y) to the segments of the polygon. In some of these cases the distance is the normal distance from the point P(x,y) to a segment between adjacent vertices of the bounding polygon, as shown in FIG. 14A. In other instances, the distance is the distance from the point P(x,y) to the nearest vertex of the bounding polygon, as shown in FIG. 14B.

The text layout boundary extraction engine 17 (FIG. 1) selects the minimal one of the computed distances as a reference distance (refDis) (FIG. 13, step 116). For example, in the case where the right side of the text block is being processed, the reference distance is given by:

$$refDis=\min(distance(refRect[i].right,P[m])) \quad (9)$$

where P[m] represents the bounding shapes of all of the logical blocks neighboring the text block, where refRect[i] represents the bounding rectangles that were least-modified in the process described above in section III.B.

The text layout boundary extraction engine 17 shrinks current edges of the bounding rectangles Rect1[i] in the selected group toward the bounding shape of the adjacent logical block based on the computed reference distance (FIG. 13, step 118). In this process, the text layout boundary extraction engine 17 modifies the bounding rectangle of each of the text lines in the selected group by shrinking the current edge of the bounding rectangle (e.g., Rect1) away from the bounding shape of the nearest logical block so that the distance between the new terminal edge and the bounding shape is at least approximately equal to the reference distance. For example, Rect2[i] may be set to minimize |refDis−dist(Rect2[i], P[m])|, as rect2[i] ranges over [origRect[i], Rect1[i]].

Figure 15:
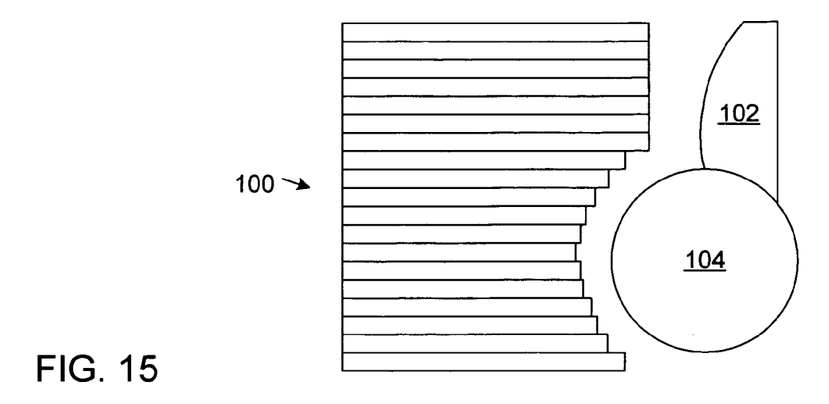
FIG. 15 shows the group of logical blocks of FIG. 12C after a selected group of the bounding rectangles has been extended to approximate the intended text wrapping around a bounding shape of an adjacent logical block in accordance with the method of FIG. 13.

FIG. 15 shows the improved text wrapping that results from applying the method of FIG. 13 to the dilated and eroded text block 100 of FIG. 12C. In this way, the method of FIG. 13 better approximates text wrapping around adjacent logical blocks and, thereby, captures the intended look and feel of the layout of textual content in the input electronic document (FIG. 1, input 14) with greater accuracy.

Figure 16:
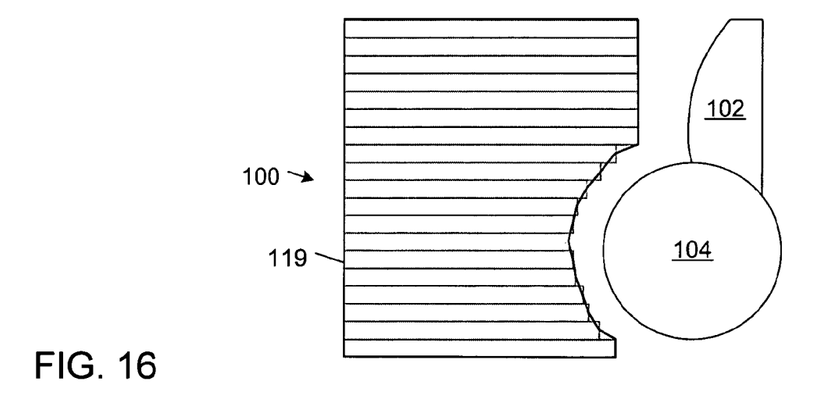
FIG. 16 shows a bounding polygon superimposed over the group of logical blocks shown in FIG. 15 in accordance with an embodiment of a method of generating a bounding polygon.

Referring to FIG. 16, in some embodiments, a bounding polygon 119 for the text block 100 is approximated by connecting the middle of the right and left edges of the bounding rectangles of all the text lines, except not at the very top and the very bottom bounding rectangles. In some cases, the resulting bounding polygon that is produced by this method is smoother and better accommodates new content with different font sizes than the saw-shaped bounding polygon that is produced by connecting the right or left top and bottom corners of the bounding rectangles of the text lines in the text block 100.

IV. GENERATING RULES CONSTRAINING LAYOUT VARIATIONS

Figure 17:
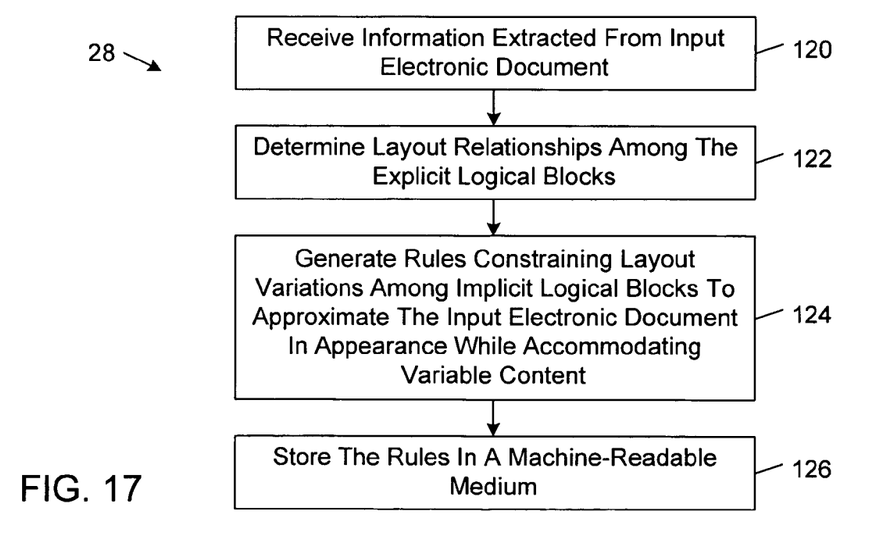
FIG. 17 is a flow diagram of an embodiment of a method of generating rules constraining layout variations among implicit logical blocks to approximate the electronic document in appearance while accommodating variable content.

As explained above, the layout constraint generation engine 18 generates rules 26 (FIG. 3) that define implicit logical blocks (FIG. 2, step 28). FIG. 17 shows an embodiment of a method by which the layout constraint generation engine 18 (FIG. 1) generates these layout constraining rules 26.

The layout constraint generation engine 18 (FIG. 1) receives the information that is extracted from the input electronic document (FIG. 1, input 14) by the static layout extraction engine 16, including logical block content, layout, style, relative positions, and layering order of the explicit logical blocks (FIG. 17, step 120).

The layout constraint generation engine 18 (FIG. 1) then determines layout relationships among the explicit logical blocks (FIG. 17, step 122). Among these layout relationships are gap relationships, overlap relationships, embedding relationships, and alignment relationships. The layout constraint generation engine 18 also determines relationships between the explicit logical blocks and the pages of the input electronic document (FIG. 1, input 14), including page margins, content bleeding, and repetitive patterns.

Based on the determined layout relationships (FIG. 17, step 122), the layout constraint generation engine 18 (FIG. 1) generates the rules 26 constraining layout variations among implicit logical blocks to approximate the input electronic document (FIG. 1, input 14) in appearance while accommodating variable content (FIG. 17, step 124). Each of the implicit logical blocks corresponds to a respective one of the explicit logical blocks and accommodates variable content having the content style that is assigned to the corresponding explicit logical block.

In general, the rules 26 that are generated by the layout constraint extraction engine 18 (FIG. 1) may be expressed in any suitable mathematical form that is capable of describing the layout and geometric relations among the implicit logical blocks, such as above, below, left of, right of, inside, and overlaps. In the illustrated embodiments, the layout constraining rules 26 correspond to linear equality and inequality objectives and constraints.

The layout constraint extraction engine 18 (FIG. 1) associates with each rule a strength label that is used by the layout constraint solver engine 20 to prioritize constraints when all of the constraints cannot be satisfied in a given layout of implicit logical blocks. The strength labels are selected from a predefined strength hierarchy that compasses strength labels for required constraints and non-required constraints. In one exemplary implementation, the strength hierarchy consists of the following strength labels in order of priority: required, strong, and weak. Rules that are associated with a "required" strength label are referred to herein as "required rules" and rules that are associated with "strong" or "weak" strength labels are referred to herein as "non-required rules".

The layout constraint generation engine 18 (FIG. 1) stores the layout constraining rules 26 in a machine-readable medium (FIG. 17, step 126).

Additional details regarding the operation of the layout constraint generation engine 18 may be obtained from U.S. patent application Ser. No. 11/055,744, which was filed Feb. 10, 2005, by Hui Chao et al., and is entitled "Constraining Layout Variations For Accommodating Variable Content In Electronic Documents," and is incorporated herein by reference.

V. GENERATING DOCUMENTS WITH VARIABLE CONTENT

After the layout constraining rules 26 (FIG. 3) have been generated (FIG. 2, step 28), the content substitution engine 19 (FIG. 1) substitutes new content for original content (FIG. 2, step 29). The layout constraint solver engine 20 then generates the output electronic document (FIG. 1, output 12) by solving the layout constraints for the specified set of document contents 32 that are assigned to the implicit logical blocks by the content substitution engine 19 (FIG. 2, step 34). In some embodiments, the layout constraint solver 20 solves the layout constraints in accordance with a simplex-based linear solver process.

As shown in FIG. 3, multiple customized output electronic documents may be generated based on the layout constraining rules 26 simply by changing the document contents assigned to the implicit logical blocks.

VI. CONCLUSION

To summarize, the embodiments described above provide ways of automatically capturing and expressing the graphic appearance of an electronic document that allow the graphic appearance to be preserved in documents that contain different content. These embodiments automatically infer from the actual position of the textual content in an electronic document a text layout boundary that corresponds to an intended template area for textual content, including on unjustified sides of the text blocks and where text lines flow around neighboring logical blocks in the electronic document. In this way, these embodiments enable the look and feel of an electronic document, including in textual regions, to be preserved in derivative electronic documents that have different contents.

Other embodiments are within the scope of the claims.

What is claimed is:

1. A machine-implemented method of processing an electronic document, comprising operating computer hardware to perform operations comprising:
   receiving logical blocks extracted from the electronic document including a text block comprising text lines each encompassed by a respective bounding rectangle;
   extending edges of ones of the bounding rectangles to at least one boundary without changing layout relationships among the logical blocks in the electronic document;
   generating a text layout boundary from extended and unextended edges of the bounding rectangles; and
   storing a description of the text layout boundary in a machine-readable medium.

2. The method of claim 1, wherein the extending comprises identifying at least one boundary to which ones of the bounding rectangles are extendable without changing layout relationships among logical blocks in the electronic document.

3. The method of claim 2, wherein the identifying of at least one boundary comprises determining a justified side of the text block to which the text lines are justified and an unjustified side of the text block opposite the justified side.

4. The method of claim 3, wherein the identifying of at least one boundary comprises identifying a candidate boundary aligned with a maximal edge of ones of the bounding rectangles on the unjustified side of the text block.

5. The method of claim 4, wherein the identifying of at least one boundary comprises dilating edges of ones of the bounding rectangles to the candidate boundary and eroding ones of the dilated bounding rectangles for which at least one overlap relationship with at least one of the neighboring blocks of the electronic document changed as a result of the dilation.

6. The method of claim 4, wherein the identifying of at least one boundary comprises determining the extendable ones of the bounding rectangles.

7. The method of claim 6, wherein the determining of the extendable ones of the bounding rectangles comprises computing distances between the candidate boundary and edges of the bounding rectangles on the unjustified side of the text block.

8. The method of claim 7, wherein the determining of the extendable ones of the bounding rectangles additionally comprises comparing the distance computed for one of the text lines to a length of a beginning word of an adjacent one of the text lines.

9. The method of claim 6, wherein the determining of the extendable ones of the bounding rectangles comprises analyzing syntactical elements of the text lines.

10. The method of claim 6, wherein the identifying of at least one boundary comprises extending to the candidate boundary respective edges of the bounding rectangles determined to be extendable.

11. The method of claim 10, wherein the identifying of at least one boundary additionally comprises reversing the extending for ones of the extended bounding rectangles with at least one layout relationship that changed as a result of the extending.

12. The method of claim 11, wherein the identifying of at least one boundary additionally comprises identifying one or more additional candidate boundaries aligned with respective maximal edges of respective groups of the bounding rectangles subject to the extending, and repeating the extending and the reversing for each of the groups.

13. The method of claim 12, wherein the generating comprises connecting the extended and unextended edges of the bounding rectangles to form at least a portion of the text layout boundary.

14. The method of claim 1, wherein the extending additionally comprises extending edges of a group of the bounding rectangles with edges adjacent to a bounding shape of an adjacent one of the logical blocks.

15. The method of claim 14, wherein the extending additionally comprises determining a reference distance and extending the edges of the bounding rectangles in the group based on the reference distance.

16. The method of claim 15, wherein the determining of the reference distance comprises computing distances between the bounding polygon of the adjacent logical block and respective edges of ones of the bounding rectangles in the group, and selecting a minimal one of the computed distances as the reference distance.

17. A machine for processing an electronic document, comprising computer hardware operable to perform operations comprising:
  extracting logical blocks from the electronic document including a text block comprising text lines each encompassed by a respective bounding rectangle;
  receiving the explicit logical blocks;
  extending edges of ones of the bounding rectangles to at least one boundary without changing layout relationships among the logical blocks in the electronic document;
  a text layout boundary from extended and unextended edges of the bounding rectangles; and
  storing a description of the text layout boundary in a machine-readable medium.

18. The machine of claim 17, wherein the text layout boundary extraction engine is configured to identify at least one boundary to which ones of the bounding rectangles are extendable without changing layout relationships among logical blocks in the electronic document.

19. The machine of claim 18, wherein the text layout boundary extraction engine is configured to determine a justified side of the text block to which the text lines are justified and an unjustified side of the text block opposite the justified side.

20. The machine of claim 19, wherein the text layout boundary extraction engine is configured to identify a candidate boundary aligned with a maximal edge of ones of the bounding rectangles on the unjustified side of the text block.

21. The machine of claim 20, wherein the text layout boundary extraction engine is configured to dilate edges of ones of the bounding rectangles to the candidate boundary and erode ones of the dilated bounding rectangles for which at least one overlap relationship with at least one of the neighboring blocks of the electronic document changed as a result of the dilation.

22. A storage device storing instructions that, when executed, cause a machine to perform operations comprising:
  receiving logical blocks extracted from the electronic document including a text block comprising text lines each encompassed by a respective bounding rectangle;
  extending edges of ones of the bounding rectangles to at least one boundary without changing layout relationships among the logical blocks in the electronic document;
  generating a text layout boundary from extended and unextended edges of the bounding rectangles; and
  storing a description of the text layout boundary in a machine-readable medium.

23. The storage device of claim 22, wherein the instructions cause the machine to perform operations comprising identifying at least one boundary to which ones of the bounding rectangles are extendable without changing layout relationships among logical blocks in the electronic document.

24. The storage device of claim 23, wherein the instructions cause the machine to perform operations comprising determining a justified side of the text block to which the text lines are justified and an unjustified side of the text block opposite the justified side.

25. The storage device of claim 24, wherein the instructions cause the machine to perform operations comprising identifying a candidate boundary aligned with a maximal edge of ones of the bounding rectangles on the unjustified side of the text block.

26. The storage device of claim 25, wherein the instructions cause the machine to perform operations comprising dilating edges of ones of the bounding rectangles to the candidate boundary and eroding ones of the dilated bounding rectangles for which at least one overlap relationship with at least one of the neighboring blocks of the electronic document changed as a result of the dilation.

27. A system for processing an electronic document, comprising:
  a storage device storing computer-readable instructions; and
  a computer processor coupled to the storage device operable to execute the instructions and based at least in part on the execution of the instructions operable to perform operations comprising:
    receiving logical blocks extracted from the electronic document including a text block comprising text lines each encompassed by a respective bounding rectangle;
    extending edges of ones of the bounding rectangles to at least one boundary without changing layout relationships among the logical blocks in the electronic document;
    generating a text layout boundary from extended and unextended edges of the bounding rectangles; and
    storing a description of the text layout boundary in a machine-readable medium.

28. The method of claim 1, further comprising based at least in part on the text layout boundary generating rules constraining layout variations among implicit logical blocks to approximate the input electronic document in appearance while accommodating variable content.

* * * * *